United States Patent [19]

Wikmar

[11] Patent Number: 4,607,134
[45] Date of Patent: Aug. 19, 1986

[54] CABLE TERMINATION WITH INTERFITTING INSULATING CAPS ENCLOSING GAS-FILLED SPACES

[75] Inventor: Kjell M. Wikmar, Alingsås, Sweden
[73] Assignee: Kabeldon Aktiebolag, Alingsås, Sweden
[21] Appl. No.: 734,966
[22] PCT Filed: Sep. 14, 1984
[86] PCT No.: PCT/SE84/00300
 § 371 Date: May 14, 1985
 § 102(e) Date: May 14, 1985
[87] PCT Pub. No.: WO85/01618
 PCT Pub. Date: Apr. 11, 1985

[30] Foreign Application Priority Data

Sep. 30, 1983 [SE] Sweden ................................. 8305363

[51] Int. Cl.[4] ........................................... H02G 15/02
[52] U.S. Cl. .................... 174/19; 174/73 R; 174/80
[58] Field of Search ............ 174/19, 20, 73 R, 73 SC, 174/74 R, 75 R, 75 D, 80

[56] References Cited

FOREIGN PATENT DOCUMENTS 91573 5/1968 France ................................... 174/80
405904 1/1979 Sweden ............................ 174/73 R Primary Examiner—Laramie E. Askin
Attorney, Agent, or Firm—Roberts, Spiecens & Cohen

[57] ABSTRACT

A termination for a cable (1) insulated with a solid polymer material, for high-tension AC comprises beaker-shaped caps of surface-leakage-current-resistant insulation material, fitted over the end of the cable. The bottom part of the first-fitted cap is surrounded by the opening of the second cap, and so on, each cap enclosing a separate gas-filled space. The opening of the first-fitted cap is closed off by an insulating disc. The separate spaces are filled with sulphur hexafluoride, $SF_6$.

8 Claims, 1 Drawing Figure

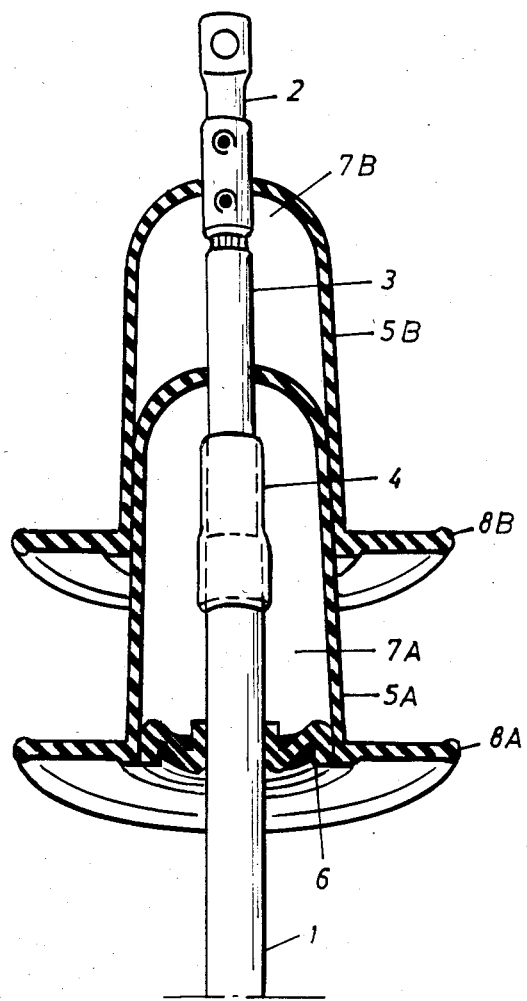

CABLE TERMINATION WITH INTERFITTING INSULATING CAPS ENCLOSING GAS-FILLED SPACES

FIELD OF THE INVENTION

The invention relates to a termination of a cable for high-tension alternating current and insulated with a solid polymer material. The termination is primarily intended for a cable with an operating voltage of 12 kV or 24 kV.

BACKGROUND

Cable terminations with termination details of synthetic rubber of the ethenepropene-diene rubber (EPDM) type are known, and an example of one is described in the Swedish examined application published Jan. 8, 1979 under the number 405,904.

SUMMARY OF THE INVENTION

In the termination of the invention there are included at least two beaker-shaped caps of surface-leakage-resistant insulation material, which are pushed over the end of the cable divested of exterior insulation, with the cable passing through the bottom of the cap, with the bottom part of the cap first put in place surrounded by the opening of the second cap and so on, each cap enclosing a separate, gas-filled space. The opening of the cap fitted first is closed by a disc insulatingly surrounding the cable.

The separate gas-filled space in each cap is filled with an insulating gas, which may be sulphur hexafluoride.

The arrangement of gas-filled spaces in the cable termination affords the advantage over previously known cable terminations that the weight of the termination is reduced, since a previously used solid insulation material has been replaced by a gaseous insulation. Furthermore, the termination with retained low weight has an outside diameter so large that the electrical field strength in all the incorporated parts is low and the risk of surface leakage current is small.

When the cable termination is to be installed outdoors, caps are used which are formed about their openings with a collar increasing surface creeping distance.

Where the cable outer sheath has its boundary, the cable is surrounded by a field control device, known per se, and this is surrounded by one of the caps, preferably the one pushed on first.

BRIEF DESCRIPTION OF DRAWINGS

An embodiment of a cable termination in accordance with the invention will now be described, with reference to the sole FIGURE of the accompanying drawing, which illustrates a longitudinal section through the termination, its caps and their collars for increasing the surface-leakage path.

DETAILED DESCRIPTION OF A BEST MODE FOR CARRYING OUT THE INVENTION

As will be seen from the drawing, in the embodiment of a cable termination in accordance with the invention a cable 1 for high-tension AC and insulated with solid polymer material is stripped at its end and provided with a cable lug 2. For a distance 3 nearest the lug, the cable is divested of its outer sheath and its conductive screening layer so that only the solid polymer material insulation remains. The boundary for the exterior insulation of the cable is surrounded by a field control device 4, known per se, for smoothing electrical field strength acting on the insulation in the longitudinal direction of the cable.

The end of the cable is surrounded by a plurality of tubular or beaker-shaped caps 5A, 5B of surface-leakage resistant insulation material, which in this case is EPDM rubber. The caps 5A and 5B are mounted on the cable with their closed bottoms facing towards the end of the cable, holes in the bottoms of the caps surrounding the cable with a tight fit. The bottom part of the cap 5A fitted first is surrounded by the opening of the second cap 5B; the second cap being fitted over the first one to about a third of its length. The first-fitted cap 5A surrounds the field control device 4.

The first-fitted cap 5A has its open end closed by an insulating disc 6, which is placed on the cable beforehand.

Gas-tight 7A, 7B are arranged in each of the caps 5A, 5B, by placing the caps inside each other and closing the cap 5A with the disc 6. The closed spaces are filled with insulating gas, sulphur hexafluoride in this case, by installing the caps on the cable in an atmosphere of $SF_6$.

To advantage, when the termination is to be installed outdoors, caps are used which are formed with radially extending, substantially flat rain guards 8A, 8B, known per se.

The invention is applicable to other embodiments of terminations. For example, the number of caps is dependent on the operating voltage of the cable, i.e. the embodiment with two caps illustrated here being intended for a voltage of 12 kV, 4 caps for 24 kV and 6 caps for 36 kV. The length of the termination increases by about 100 mm for each additional cap.

In the described embodiment, the caps 5A, 5B are made from synthetic EPDM rubber, but they may also be made from other similar material, e.g. silicone rubber.

In order that the termination can be used with cables of different dimensions, the caps are intended to be made in several sizes, one size of the caps being used for cables of considerably varying dimensions so that the number of sizes of the caps is only moderate.

What is claimed is:

1. A termination for a cable insulated with solid polymer material for high-tension AC, comprising at least two beaker-shaped caps of surface-leakage-resistant insulation material fitted over an end of a cable whose outer sheath and conducting screening layer have been removed, said caps having closed bottoms with holes through which the cable passes in gas-tight relation and open ends remote from said closed bottoms, the bottom of the first fitted cap being engaged in the opening of the second cap and so on, each cap enclosing a separate gas-tight space therein around the cable between the bottom of the next cap, each separate gas-tight space containing an electrically insulating gas therein.

2. A termination as claimed in claim 1, comprising a disc insulatingly surrounding the cable and closing off the opening of the first fitted cap.

3. A termination as claimed in claim 1, wherein sulphur hexafluoride ($SF_6$) is enclosed in each separate gas-tight sapce as said electrically insulating gas.

4. A termination as claimed in claim 1 comprising a collar around the opening of each cap for extending the surface-leakage path.

5. A termination as claimed in claim 1, comprising a field control device surrounding the boundary of the outer cable insulation, and one of the caps surrounding said device.

6. A termination as claimed in claim 6 wherein each cap is sealingly fitted onto the next adjacent cap over a portion of the length thereof.

7. A termination as claimed in claim 6 wherein the caps are sealingly interfitted by elastically pressing one cap on the next.

8. A termination as claimed in claim 1 wherein each cap is sealingly fitted onto the next cap over a distance of about one third of the length of the cap.

* * * * *